US010339694B2

(12) United States Patent
Shin et al.

(10) Patent No.: US 10,339,694 B2
(45) Date of Patent: Jul. 2, 2019

(54) RAY TRACING APPARATUS AND METHOD

(71) Applicant: Samsung Electronics Co., Ltd., Suwon-si (KR)

(72) Inventors: Youngsam Shin, Hwaseong-si (KR); Wonjong Lee, Seoul (KR); Seokjoong Hwang, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 190 days.

(21) Appl. No.: 14/997,028

(22) Filed: Jan. 15, 2016

(65) Prior Publication Data

US 2016/0284117 A1 Sep. 29, 2016

(30) Foreign Application Priority Data

Mar. 25, 2015 (KR) .................. 10-2015-0041642

(51) Int. Cl.
*G06T 15/06* (2011.01)
*G06T 15/00* (2011.01)
(52) U.S. Cl.
CPC .................................. *G06T 15/06* (2013.01)
(58) Field of Classification Search
CPC ........................................................ G06T 15/06
See application file for complete search history.

(56) References Cited

U.S. PATENT DOCUMENTS

| 2008/0088622 A1* | 4/2008 | Shearer ............... G06T 15/40 345/421 |
| 2012/0069023 A1* | 3/2012 | Hur ..................... G06T 15/06 345/426 |
| 2012/0081368 A1* | 4/2012 | Park .................... G06T 15/005 345/426 |
| 2014/0071123 A1 | 3/2014 | Peterson et al. |

FOREIGN PATENT DOCUMENTS

| KR | 10-2010-0128493 A | 12/2010 |
| KR | 10-2012-0032159 A | 4/2012 |
| WO | WO 2011/073361 A1 | 6/2011 |

* cited by examiner

*Primary Examiner* — Samantha (Yuehan) Wang
(74) *Attorney, Agent, or Firm* — Harness, Dickey & Pierce, P.L.C.

(57) ABSTRACT

A ray tracing apparatus includes a ray generator and a traversal (TRV)/intersection test (IST) integrator. The ray generator is configured to generate a ray. The TRV/IST integrator is configured to receive the ray, determine one of a ray-node intersection test, an intersection distance test, and a hit point test to be performed based on a state of the ray input thereto, and perform the determined test with respect to the ray. The ray-node intersection test, the intersection distance test, and the hit point test are performed with respect to the ray through same pipeline.

19 Claims, 11 Drawing Sheets

FIG. 5

| Arithmetic Unit | # of unit |
|---|---|
| sub | 6 |
| mul | 6 |
| comp | 3 |
| comp | 2 |
| comp | 2 |
| comp | 3 |

| Arithmetic Unit | # of unit |
|---|---|
| mul | 4 |
| adder | 2 |
| adder | 2 |
| sub | 1 |
| inv | 1 |
| mul | 1 |
| comp | 2 |

| Arithmetic Unit | # of unit |
|---|---|
| mul | 2 |
| adder | 2 |
| mul | 4 |
| adder | 2 |
| adder | 2(1) |
| comp | 3 |

| TRV-AABB | IST-T | IST-H |
|---|---|---|
|  |  | mul(2) |
| sub(6) |  | adder(2) |
| mul(6) | mul(4) | mul(4) |
| comp(3) | adder(2) | adder(2) |
| comp(2) | adder(2) | adder(2) |
|  | sub(1) |  |
|  | RCP(1) |  |
| comp(2) | mul(1) |  |
| comp(3) | comp(2) | comp(3) |

| Stage 1 | mul(2) | |
| Stage 2 | Sub(4) | Sub-add(2) |
| Stage 3 | Mul(6) | |
| Stage 4 | Comp(1) | Comp-add(2) |
| Stage 5 | Comp-add(2) | |
| Stage 6 | Sub(1) | |
| Stage 7 | RCP(1) | |
| Stage 8 | Comp(2) | Mul(1) |
| Stage 9 | Comp(3) | |

RAY TRACING APPARATUS AND METHOD

CROSS-REFERENCE TO RELATED APPLICATION(S)

This application claims the benefit under 35 USC 119(a) of Korean Patent Application No. 10-2015-0041642, filed on Mar. 25, 2015, in the Korean Intellectual Property Office, the entire disclosure of which is incorporated herein by reference for all purposes.

BACKGROUND

1. Field

The following description relates to ray tracing apparatuses and methods, and more particularly, to ray tracing apparatuses having an integrated hardware unit including a traversal (TRV) unit combined with an intersection test (IST) unit and ray tracing methods therefor.

2. Description of Related Art

Three-dimensional (3D) rendering refers to image processing for synthesizing data of a 3D object into an image that may be seen at a given viewpoint of a camera.

Rasterization and ray tracing are two representative rendering methods. In rasterization, an image is generated by projecting a 3D object onto a screen. Ray tracing is a technique for generating an image by tracing a path of a light ray from a viewpoint of a camera toward each pixel of an image.

Among the rendering methods, ray tracing is capable of producing a high quality image by simulating the physical properties of light such as reflection, refraction, transmission, etc. However, since this technique requires a significant amount of calculation, it is difficult to perform high-speed rendering.

In ray tracing, operations requiring a large amount of computation are generation and traversal (hereinafter, referred to as 'TRV') of an acceleration structure, where scene objects to be rendered are spatially divided, and an intersection test (hereinafter, referred to as 'IST') between a ray and a primitive.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a ray tracing apparatus includes: a ray generator configured to generate a ray and transmit the ray; and the traversal (TRV)/intersection test (IST) integrator configured to receive the ray, determine one of a ray-node intersection test, an intersection distance test, and a hit point test to be performed based on a state of the ray input thereto and perform the determined test with respect to the ray. The TRV/IST integrator is configured to perform the ray-node intersection test, the intersection distance test, and the hit point test with respect to the ray through a same pipeline.

The ray tracing apparatus may further include a ray state updater configured to update the state of the ray received from the TRV/IST integrator based on a result obtained by performing the determined test and transmit the ray to the TRV/IST integrator.

The TRV/IST integrator may perform at least one arithmetic operation included in the ray-node intersection test, at least one arithmetic operation included in the intersection distance test, and at least one arithmetic operation included in the hit point test via same arithmetic unit in at least one stage included in the same pipeline.

The ray state updater may be configured to update the state of the ray so as not to perform the hit point test between the ray and a first primitive intersected by the ray, when a distance from the ray to the first primitive is determined not to be a valid distance as a result of the intersection distance test.

The ray state updater may be configured to update the state of the ray so as to perform the hit point test between the ray and a first primitive intersected by the ray, when a distance from the ray to the first primitive is determined to be a valid distance as a result of the intersection distance test.

The ray tracing apparatus may further include a shader configured to receive a hit point between the ray and a primitive intersected by the ray and determine a color value of a pixel based on the hit point.

The ray tracing apparatus may further include a TRV tester configured to perform only the ray-node intersection test.

The ray tracing apparatus may further include a ray dispatcher configured to determine whether to transmit the ray to the TRV tester or the TRV/IST integrator based on the state of the ray and workloads of the TRV tester and the TRV/IST integrator.

in another general aspect, a ray tracing method includes: generating a ray at a ray generator; inputting the ray to a traversal (TRV)/intersection test (IST) integrator; determining, at the TRV/IST integrator, one of a ray-node intersection test, an intersection distance test, and a hit point test based on a state of the ray; and performing, at the TRV/IST integrator, the determined test with respect to the ray. The TRV/IST integrator is configured to perform the ray-node intersection test, the intersection distance test, and the hit point test with respect to the ray through same pipeline.

The ray tracing method may further include: updating, at a ray state updater, the state of the ray received from the TRV/IST integrator, based on a result obtained by performing the determined test; and transmitting the ray to the TRV/IST integrator.

At least one arithmetic operation included in the ray-node intersection test, at least one arithmetic operation included in the intersection distance test, and at least one arithmetic operation included in the hit point test may be performed via a same arithmetic unit in at least one stage included in the same pipeline.

The updating of the state of the ray may include updating the state of the ray so as not to perform the hit point test between the ray and a first primitive intersected by the ray, when a distance from the ray to the first primitive is determined not to be a valid distance as a result of the intersection distance test.

The updating of the state of the ray may include updating the state of the ray so as to perform the hit point test between the ray and a first primitive intersected by the ray, when a distance from the ray to the first primitive is determined to be a valid distance as a result of the intersection distance test.

The ray tracing method may further include performing shading at a shader by determining a color value of a pixel based on a hit point between the ray and a primitive intersected by the ray, the hit point being calculated as a result of the hit point test.

The ray tracing method may further include performing the ray-node intersection test through a pipeline other than the same pipeline.

The ray tracing method may further include determining, at a ray dispatcher, whether the ray is to be transmitted to a TRV tester or the TRVIST integrator, based on the state of the ray and workloads of the TRV tester including the pipeline other than the same pipeline and on the TRV/IST integrator including the same pipeline.

A non-transitory computer-readable recording medium may have recorded thereon a program configured to execute the method on a computer.

In yet another general aspect, a ray tracing apparatus may include: a ray generator configured to generate a ray; and a ray dispatcher configured to transmit the ray to a traversal (TRV) tester or a TRV/intersection test (IST) integrator. The TRV tester may be configured to perform, with respect to the ray, only a ray-node intersection test. The TRV/IST integrator may be configured to perform, with respect to the ray, one of the ray-node intersection test, an intersection distance test, and a hit point test. The ray dispatcher may be configured to determine whether to transmit the ray to the TRV tester or the TRV/IST integrator based on a state of the ray and workloads of the TRV tester and the TRV/IST integrator.

The ray dispatcher may be configured to transmit the ray to the TRV tester when the state of the ray is suitable for performing the ray-node intersection test and the workload of the TRV tester is lower than the workload of the TRV/IST integrator. The ray dispatcher may be configured to transmit the ray to the TRV/IST integrator when the state of the ray is suitable for performing the ray-node intersection test and the workload of the TRV/IST integrator is lower than the workload of the TRV tester.

The TRV/IST integrator may be configured to perform the ray-node intersection test, the intersection distance test, and the hit point test with respect to the ray through a same pipeline.

Other features and aspects will be apparent from the following detailed description, the drawings, and the claims.

BRIEF DESCRIPTION OF THE DRAWINGS

FIG. 5 illustrates the types and number of arithmetic units needed for a ray-node intersection test according to an example embodiment.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Figure 1:
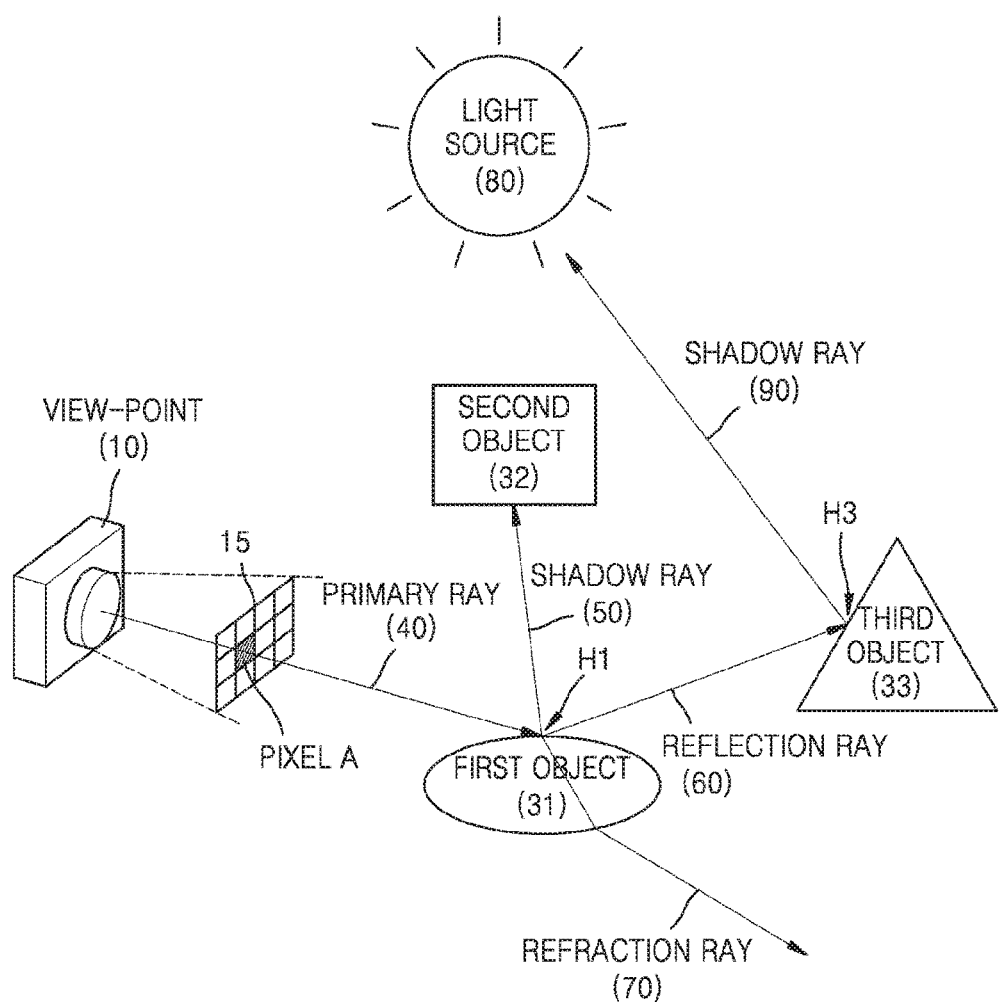
FIG. 1 is a diagram illustrating a general ray tracing method.

FIG. 1 is a diagram illustrating a general ray tracing method.

Referring to FIG. 1, a three-dimensional (3D) modeling system may include a light source 80, a first object 31, a second object 32, and a third object 33. Although FIG. 1 shows that each of the first through third objects 31 through 33 is represented as a two-dimensional (2D) image for convenience of explanation, the first through third objects 31 through 33 are 3D objects.

In this case, it is assumed that the first object 31 may have a reflectance and a refractive index greater than 0, and the second and third objects 32 and 33 may each have a reflectance and refractive index equal to 0. In other words, the first object 31 reflects and refracts light, and the second and third objects 32 and 33 neither reflect nor refract light.

In the three-dimensional (3D) modeling system shown in FIG. 1, a rendering apparatus (e.g., a ray tracing apparatus 100 of FIG. 2) determines a viewpoint 10 in order to generate a 3D image and determines a screen 15 according to the viewpoint 10. When the viewpoint 10 and the screen 15 are determined, the ray tracing apparatus 100 may generate a ray from the view-point 10 through each pixel in the screen 15. For example, if the screen 15 has a resolution of 4*3, a ray may be generated for each of twelve (12) pixels.

Only a ray for one pixel (pixel A) will now be described.

Referring to FIG. 1, a primary ray 40 is generated from the viewpoint 10 to pass through the pixel A and a 3D space to reach the first object 31. The first object 31 may be composed of a set of predetermined unit regions (hereinafter, referred to as 'primitives'). A primitive may be a polygon such as a triangle or rectangle. It is assumed hereinafter, for example purposes, that a primitive is a triangle.

A shadow ray 50, a reflection ray 60, and a refraction ray 70 may be generated at a hit point H1 between the primary ray 40 and the first object 31. In this case, the shadow ray 50, the reflection ray 60, and the refraction ray 70 are called secondary rays.

The shadow ray 50 is emitted from the hit point H1 toward the light source 80. The reflection ray 60 is generated in a direction corresponding to an incident angle of the primary ray 40 and is given a weight according to the reflectance of the first object 31. The refraction ray 70 is generated in a direction corresponding to the incident angle of the primary ray 40 and the refractive index of the first object 31 and is given a weight according to the refractive index of the first object 31.

The ray tracing apparatus 100 determines whether the hit point H1 is exposed to the light source 80 through the shadow ray 50. For example, as shown in FIG. 1, when the shadow ray 50 meets the second object 32, a shadow may be created at the hit point H1 where the shadow ray 50 is generated. In addition, the ray tracing apparatus 100 determines whether the refraction ray 70 and the reflection ray 60 reach another object. For example, as shown in FIG. 1, no objects are present in a direction that the refraction ray 70 travels, and the reflection ray 60 reaches the third object 33. The ray tracing apparatus 100 determines the coordinates of a hit point H3 on the third object 33 and color information of the third object 33 and generates a shadow ray 90 from the hit point on the third object 33. In this case, the ray tracing apparatus 100 determines whether the shadow ray 90 is exposed to the light source 80.

Since the reflectance and the refractive index of the third object 33 are 0, a reflection ray and a refraction ray for the third object 33 are not generated.

As described above, the ray tracing apparatus 100 analyzes the primary ray 40 for pixel A and all rays derived from the primary ray 40, and determines a color value of pixel A according to an analysis result. The determination of the color value of pixel A is also affected by a color of the hit point H1 of the primary ray 40, a color of the hit point H3 of the reflection ray 60, and whether the shadow ray 50 reaches the light source 80.

The ray tracing apparatus 100 may perform the above-described operations with respect to all of the pixels that constitute the screen 15.

Figure 2:
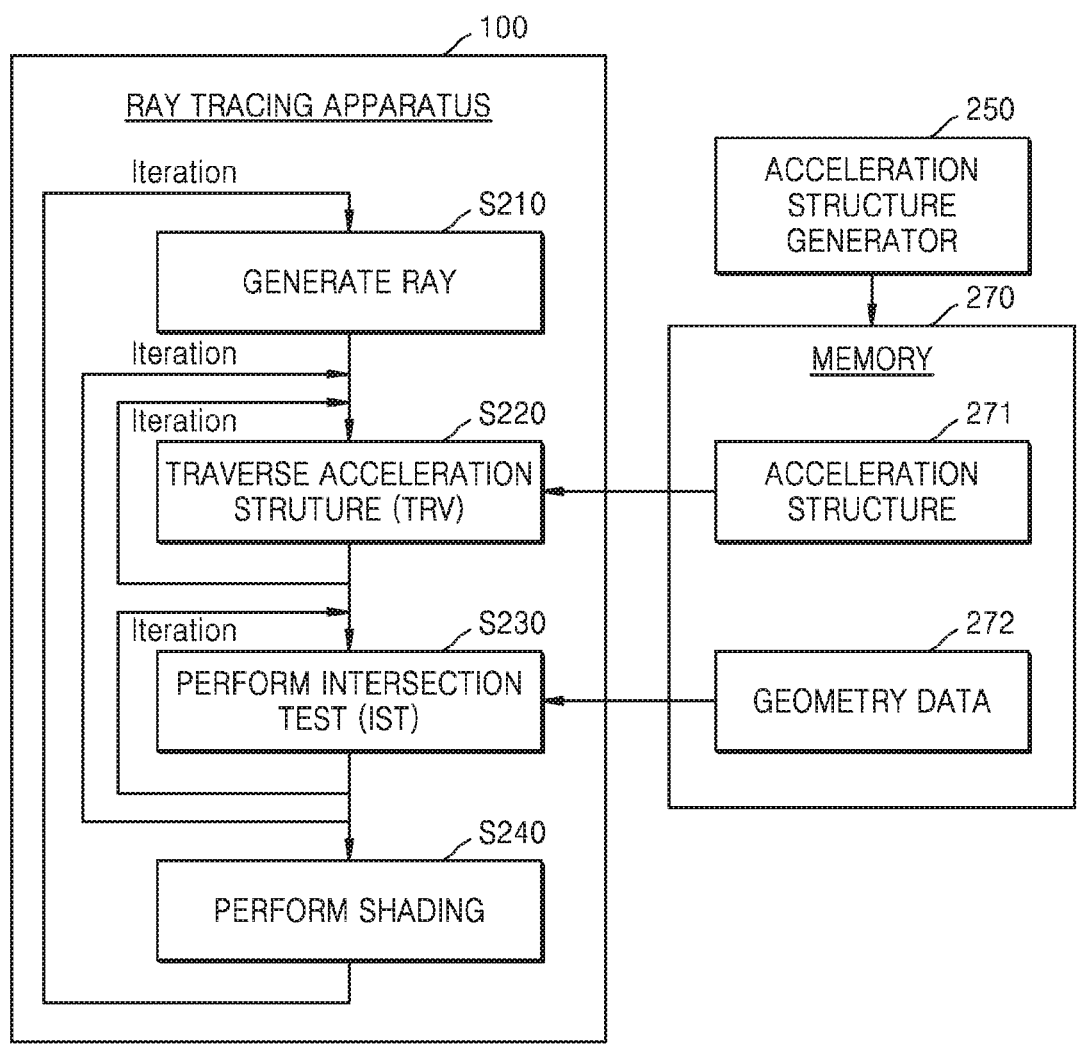
FIG. 2 illustrates an example operation of ray tracing processing system.

FIG. 2 illustrates operation of a ray tracing processing system according to an example embodiment.

Referring to FIG. 2, the ray tracing processing system includes a ray tracing apparatus 100, an external memory 270, and an acceleration structure generator 250.

The ray tracing apparatus 100 generates rays in operation S210. The rays may include a primary ray and rays derived from the primary ray. For example, the ray tracing apparatus 100 may generate a primary ray from the viewpoint (e.g., viewpoint 10 of FIG. 1) and a secondary ray at a hit point between the primary ray and an object. In this case, the secondary ray may be a reflection ray, a refraction ray, or a shadow ray generated at a point where the primary ray intersects an object.

Furthermore, the ray tracing apparatus 100 may generate a tertiary ray at a hit point between the secondary ray and an object. The ray tracing apparatus 100 may generate rays continuously until a ray does not intersect an object, or for a predetermined number of times.

In operation S220, the ray tracing apparatus 100 reads information about an acceleration structure 271 from the external memory 270 and traverses the acceleration structure 271 based on the generated rays.

In this case, the acceleration structure 271 is generated by the acceleration structure generator 250 and stored in the external memory 270

The acceleration structure generator 250 may generate the acceleration structure 271 including position information of objects in a 3D space. The acceleration structure generator 250 subdivides the 3D space into a hierarchical tree structure. The acceleration structure generator 250 may generate various types of acceleration structures. For example, the acceleration structure generator 250 may generate acceleration structures that describe a relationship between objects in the 3D space according to a K-dimensional tree (KD-tree) or a bounding volume hierarchy (BVH), which will be described in detail with reference to FIG. 3.

Figure 3:
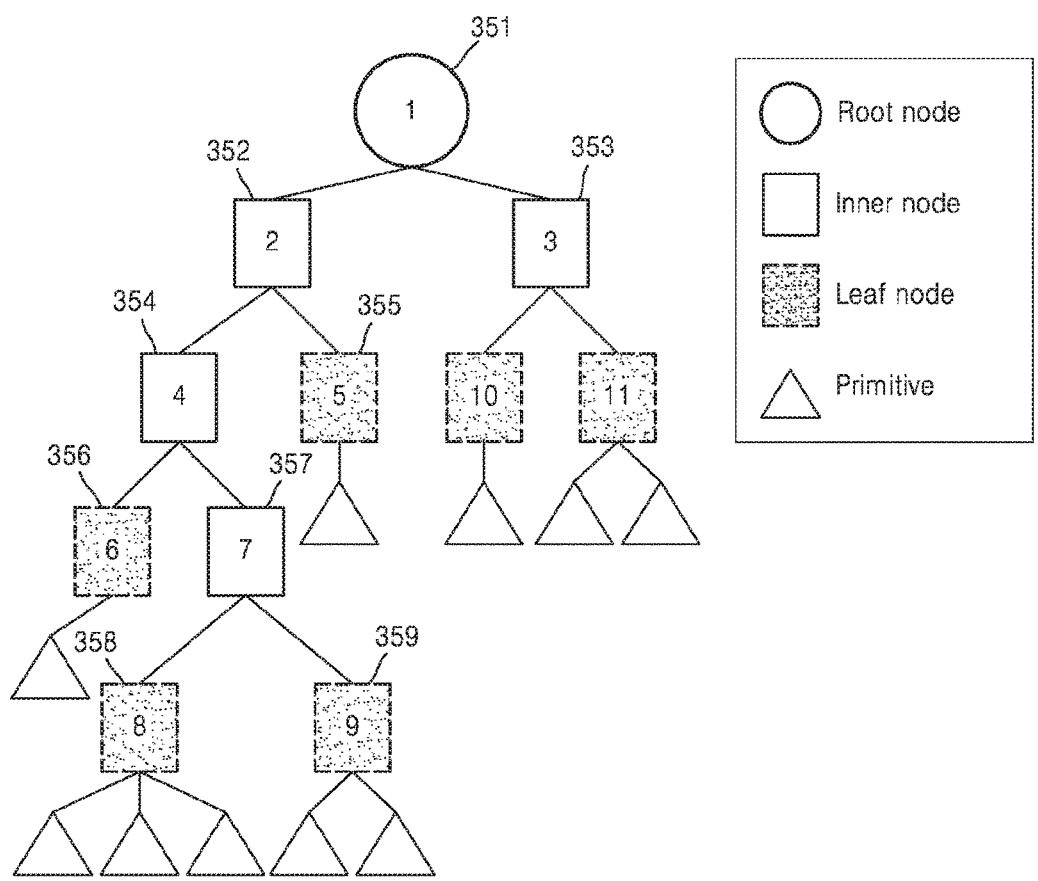
FIG. 3 shows an example acceleration structure.

FIG. 3 shows an acceleration structure according to an example embodiment.

Hereinafter, for convenience of explanation, a numeral described in each node in the acceleration structure is used to denote the corresponding node. For example, a circular node labelled with a number 1, a quadrangular node labelled with a number 2, and a dashed-line quadrangular node labelled with a number 5 may be referred to as a first node 351, a second node 352, and a fifth node 355, respectively.

Referring to FIG. 3, the acceleration structure may include a top node, inner nodes, leaf nodes, and primitives. As described herein, a top node is a node is an uppermost node having lower nodes and no upper nodes, an inner node is a node having both upper nodes and lower nodes, and a leaf node is a node having upper nodes and no lower nodes.

The first node 351 denotes a top node. For example, the first node 351 may have two lower nodes such as the second and third nodes 352 and 353, respectively. The second node 352 may be an inner node. For example, the second node may have the first node 351 as an upper node and fourth and fifth nodes 354 and 355, respectively, as lower nodes. Furthermore, an eighth node 358 may be a leaf node. For example, the eighth node 358 may have a seventh node 357.

The leaf node may contain primitives. For example, as shown in FIG. 3, a sixth node 356 that is a leaf node may contain a single primitive. The eighth node 358 and a ninth node 359, which are also leaf nodes, may respectively contain three primitives and two primitives, respectively.

Referring back to FIG. 2, the ray tracing apparatus 100 traverses the read information about the acceleration structure 271 to detect a leaf node intersected by a ray. The ray tracing apparatus 100 may iteratively traverse the acceleration structure 271 until a leaf node intersected by the ray is detected.

The ray tracing apparatus 100 may traverse an acceleration structure along one path, and if a ray does not intersect a leaf node along the path, the ray tracing apparatus 100 may traverse the acceleration structure along another path. For example, referring to FIG. 3, the ray tracing apparatus 100 may start traversal from the second or third node 352 or 353 that is a lower node of the first node 351. If the traversal starts from the second node 352, the ray tracing apparatus 100 may store information about the third node 353 in a separate memory.

The ray tracing apparatus 100 may determine whether a ray intersects the second node 352, and if the ray intersects the second node 352, the ray tracing apparatus 100 may perform traversal on one of the fourth and fifth nodes 354 and 355 that are lower nodes of the second node 352.

If the traversal is performed to determine whether a ray intersects the fourth node 354, the ray tracing apparatus 100 may store information about the other node, i.e., the fifth node 355, in the separate memory. If the ray intersects the fourth node 354, the ray tracing apparatus 100 may perform traversal on one of sixth and seventh nodes 356 and 357 that are lower nodes of the fourth node 354.

If the traversal is performed on the sixth node 356 in order to determine whether a ray intersects the sixth node 356, the ray tracing apparatus 100 may store information about the other node, i.e., the seventh node 357, in the separate memory. If the ray intersects the sixth node 356, the ray tracing apparatus 100 may detect the sixth node 356 as a leaf node.

In this way, the ray tracing apparatus 100 may detect a leaf node by performing traversal of nodes along one path while storing information about other, untraversed nodes on another path in a separate memory. After completing the traversal along the path, the ray tracing apparatus 100 may resume traversal from a node whose information was last stored. For example, after detecting the sixth node 356 as a leaf node, traversal may resume from the seventh node 357 whose information was last stored.

Thus, after completing traversal along one path, the ray tracing apparatus 100 may perform traversal from a node on a path closest to the one path, rather than performing traversal back from a top node, so the amount of computation to perform traversal is reduced.

When a leaf node is detected, the ray tracing apparatus 100 reads information about primitives (geometry data 272) contained in the primitives in the detected leaf node from the external memory 270.

In operation S230, ray tracing apparatus 100 performs an intersection test between a ray and primitives bases on the read information about the primitives. For example, if the detected leaf node includes three primitives (e.g., first through third primitives), the ray tracing apparatus 100 may perform intersection tests between a ray and each of the first through third primitives, thereby detecting a primitive intersected by the ray.

In this way, the ray tracing apparatus 100 detects primitives intersected by rays and calculate hit points where the rays intersect the detected primitives.

In operation S240, ray tracing apparatus 100 performs shading on a pixel based on an intersection test result.

The ray tracing apparatus 100 may determine a color value of a pixel based on information about a hit point and material properties of the hit point. Furthermore, the ray tracing apparatus 100 may determine a color value of a pixel in consideration of a fundamental color of a material of a hit point, an effect caused by light emitted from a light source, etc. For example, the ray tracing apparatus 100 may determine a color value of the pixel A of FIG. 1 by taking into account all effects caused by the primary ray 40 and the secondary rays, i.e., the refraction ray 70, the reflection ray 60, and the shadow ray 50.

After completing operation S240, the ray tracing apparatus 100 proceeds to operation S210. After performing shading on one pixel, the ray tracing apparatus 100 performs operations S210 through S240 again in order to perform shading on another pixel. In this way, the ray tracing apparatus 100 iteratively performs operations S210 through S240 on all pixels that constitute a screen.

In addition, the ray tracing apparatus 100 may receive data necessary for ray tracing from the external memory 270. The external memory 270 may store the acceleration structure 271 or the geometry data 272. The acceleration structure 271 may be generated by the acceleration structure generator 250 and stored in the external memory 270. The geometry data 272 represents information about primitives. A primitive may be a polygon such as a triangle or quadrangle, and the geometry data 272 may describe information about vertices and positions of primitives included in an object. For example, when a primitive is a triangle, the geometry data 272 may include coordinates, normal vectors, or texture coordinates of the three vertices of the triangle.

Figure 4:
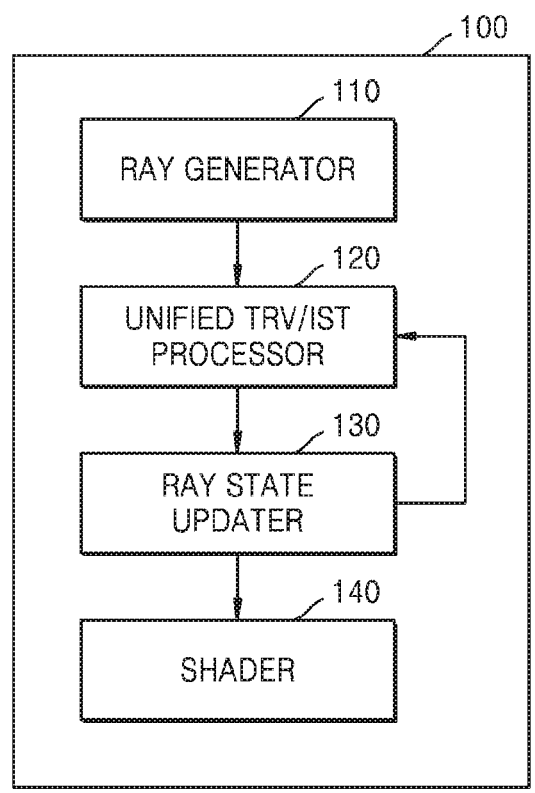
FIG. 4 is an example block diagram of a ray tracing apparatus.

FIG. 4 is a block diagram of a ray tracing apparatus 100 according to an example embodiment.

Referring to FIG. 4, the ray tracing apparatus 100 includes a ray generator 110, a transversal (TRV)/intersection test (IST) integrator 120, a ray state updater 130, and a shader 140.

As described with respect to operation S210 of FIG. 2, the ray generator 110 may generate a primary ray and rays derived from the primary ray.

The TRV/IST integrator 120 may have a pipeline structure adapted to maximize data processing throughput per cycle by dividing a data processing process into a plurality of stages and processing a plurality of pieces of data at different stages in parallel. Each stage in the pipeline structure may include different arithmetic operations and different data processing operations may be performed at each stage. In the pipeline structure, pieces of data are processed as they pass sequentially through each of the stages. Furthermore, the TRV/IST integrator 120 may be implemented as a pipeline structure capable of performing one of a ray-node intersection test, an intersection distance test, and a hit point test, based on a state of an input ray. The pipeline structure of the TRV/IST integrator 120 will be described in more detail below with reference to FIGS. 5 through 8.

The ray state updater 130 receives a result obtained by performing one of a ray-node intersection test, an intersection distance test, and a hit point test from the TRV/IST integrator 120 to update a state of a ray. For example, if the TRV/IST integrator 120 performs a ray-node intersection test to detect a leaf node intersected by a ray, the ray state updater 130 may update a state of the ray to be suitable for performing an intersection distance test between the ray and a primitive in the detected leaf node. Alternatively, if the TRV/IST integrator 120 performs an intersection distance test to determine if an intersection distance is a valid distance, the ray state updater 130 may update a state of the ray to be suitable for calculating a hit point between the ray and the primitive.

The shading unit 140 receives a calculated hit point from the TRV/IST integrator 120. The shader 140 also determines a color value of a pixel based on information about the hit point and material properties of the hit point. Furthermore, the shader 140 may determine a color value of a pixel based on a fundamental color of a material of a hit point, an effect caused by light emitted from a light source, etc. For example, the shader 140 determines a color value of a pixel A of FIG. 1 based on all effects caused by the primary ray 40 and the secondary rays, i.e., the refraction ray 70, the reflection ray 60, and the shadow ray 50.

A pipeline structure of the TRV/IST integrator 120 shown in FIG. 4 is described in detail with reference to FIGS. 5 through 8.

FIG. 5 illustrates the types and number of arithmetic units needed for a ray-node intersection test according to an example embodiment.

For example, the ray tracing apparatus 100 may perform a ray-node intersection test by using the algorithm illustrated in Table 1 below. Since the algorithm in Table 1 is known in the art, a detailed description thereof is omitted.

TABLE 1

Xmin = (BB.xmin − Ray.orgx)*Ray.dirx
Xmax = (BB.xmax − Ray.orgx)*Ray.dirx
Ymin = (BB.ymin − Ray.orgy)*Ray.diry
Ymax = (BB.ymax − Ray.orgy)*Ray.diry
Zmin = (BB.zmin − Ray.orgz)*Ray.dirz
Zmax = (BB.zmax − Ray.orgz)*Ray.dirz
Max of min (_min) = max (max(min(Xmin, Xmax), min(Ymin, Ymax)), min(Zmin, Zmax))
Min of max (_max) = min (min(max(Xmin, Xmax), max(Ymin, Ymax)), max(Zmin, Zmax))
Intersection ? (_min <= _max) && (_max >= Ray.tmin) && (_min <= hitt)

As illustrated in Table 1, six (6) subtractions and six (6) multiplications are needed to calculate Xmin, Xmax, Ymin, Ymax, Zmin, and Zmax. Furthermore, calculating Max of min(_min) requires three comparison operations with respect to max(min(Xmin, Xmax), min(Ymin, Ymax)) and two additional comparison operations between a resultant value of max(min(Xmin, Xmax), min(Ymin, Ymax)) and min(Zmin, Zmax) for calculating a maximum value. Furthermore, referring to Table 1, to calculate Min of max (_max), no comparison operations are needed for max (Xmin, Xmax), max(Ymin, Ymax), and max(Zmin, Zmax) since min(Xmin, Xmax), min(Ymin, Ymax), and min(Zmin, Zmax) have been already obtained in the calculation of Max of min. Thus, only two comparison operations are needed.

Referring to FIG. 5, the ray tracing apparatus 100 may perform a ray-node intersection test by sequentially using six (6) subtractors (sub), six (6) multipliers (mul), three (3) comparators (comp), two (2) comparators (comp), and three (3) comparators according to a sequence of the algorithm illustrated in Table 1.

Figures 6A, 6B:
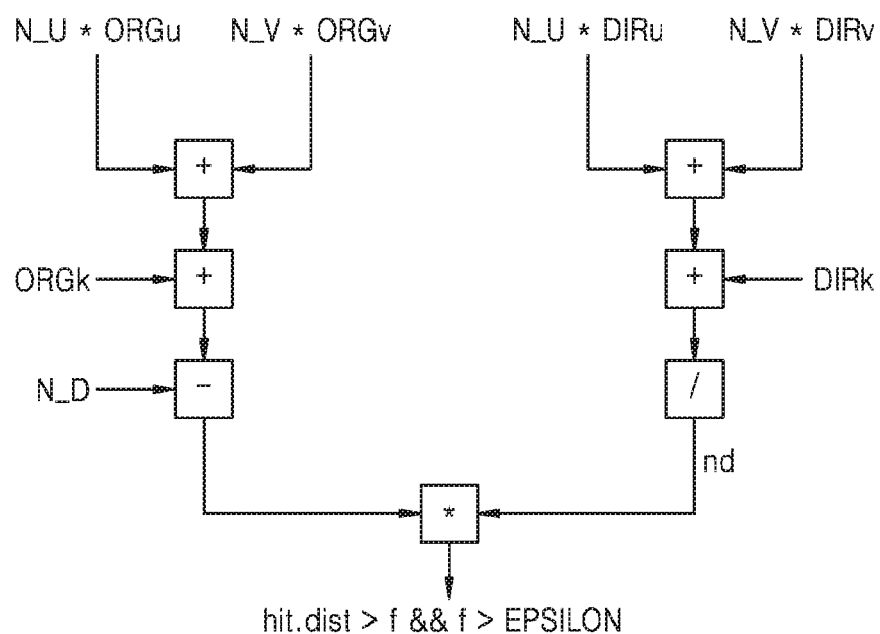
FIG. 6A illustrates an example process of performing arithmetic operations during an intersection distance test.
FIG. 6B illustrates the types and number of arithmetic units required for the intersection distance test according to an example embodiment.

FIG. 6A illustrates a process of performing arithmetic operations included in an intersection distance test according to an example embodiment, and FIG. 6B illustrates the types and number of arithmetic units required for the intersection distance test according to an example embodiment.

According to an example embodiment, the ray tracing apparatus 100 may perform an intersection distance test (IST-T) and a hit point test (computation of a hit point, IST-H) separately as an intersection test (IST). For example, the ray tracing apparatus 100 may perform an intersection distance test (IST-T) to determine whether a distance to a point where a ray intersects a primitive (a depth from a view-point to a hit point) is a valid distance. The distance to the point where the ray intersects the object is valid when the distance is less than a distance to a hit point (hit.dist of Table 2) that is previously computed and stored. The ray tracing apparatus 100 performs a hit point test (computation of a hit point) with regard to a point where a ray intersects a primitive only when a distance to the point is valid.

According to an example embodiment, the ray tracing apparatus 100 may perform an intersection distance test (IST-T) by using the algorithm illustrated in Table 2 below. Since the algorithm of Table 2 for performing the intersection distance test (IST-T) is known in the art, a detailed description thereof is omitted.

TABLE 2

// don't prefetch here, assume data has already been prefetched
// start high-latency division as early as possible
float nd = Inv(ray.dir[acc.k] + acc.n_u * ray.dir[ku] + acc.n_v * ray.dir[kv]);
float f = (acc.n_d − ray.org[acc.k] − acc.n_u * ray.org[ku] − acc.n_v * ray.org[kv]) * nd;

TABLE 2-continued

// check for valid distance.
if (!(hit.dist > f && f > EPSILON )) return;

FIG. 6A illustrates a process of performing arithmetic operations according to the algorithm illustrated in Table 2.

Referring to Table 2 and FIG. 6A, two multiplications, two additions, and one inversion operation are needed to calculate parameter nd. Furthermore, two multiplications, two additions, one subtraction, and one multiplication are needed sequentially to calculate an intersection distance f. In addition, two comparison operations are required to determine whether the intersection distance f is a valid distance.

In detail, referring to FIG. 6B, the ray tracing apparatus 100 may perform an intersection distance test by sequentially using arithmetic units, i.e., four (4) multipliers (mul), two (2) adders (adder), two (2) adders (adder), one (1) subtractor (sub), one inverter (inv), one (1) multiplier (mul), and two (2) comparators (comp), according to a sequence of the algorithm illustrated in Table 2.

Figures 7A, 7B:
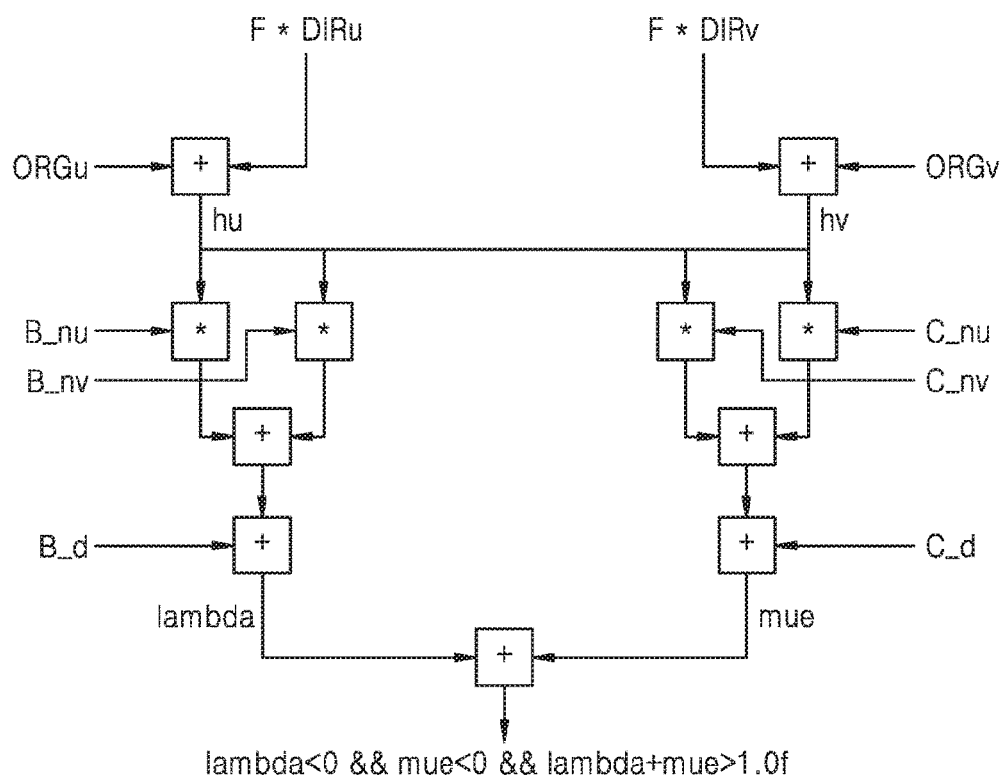
FIG. 7A illustrates an example process of performing arithmetic operations during a hit point test according.
FIG. 7B illustrates the types and number of arithmetic units needed for a hit point test according to an example embodiment.

FIG. 7A illustrates a process of performing arithmetic operations included in a hit point test according to an example embodiment, and FIG. 7B illustrates the types and number of arithmetic units needed for the hit point test according to an example embodiment.

According to an example embodiment, the ray tracing apparatus 100 performs a hit point test (IST-H) only when a distance to a point where a ray intersects a primitive is a valid distance. For example, the ray tracing apparatus 100 may perform a hit point test (IST-H) by using the algorithm illustrated in Table 3 below. Since the algorithm of Table 3 for performing the hit point test (IST-H) is known in the art, a detailed description thereof is omitted.

TABLE 3

// compute hitpoint positions on uv plane
float hu = (ray.org[ku] + f * ray.dir[ku]);
float hv = (ray.org[kv] + f * ray.dir[kv]);
// check first barycentric coordinate
float lambda = (hu * acc.b_nu + hv * acc.b_nv + acc.b_d);
if (lambda < 0.0f) return;
// check second barycentric coordinate
float mue = (hu * acc.c_nu + hv * acc.c_nv + acc.c_d);
if (mue < 0.0f) return;
// check third barycentric coordinate
if (lambda+mue > 1.0f) return;

FIG. 7A illustrates a process of performing arithmetic operations for the algorithm illustrated in Table 3.

Referring to Table 3 and FIG. 7A, two multiplications and two additions are required to compute parameters hu and hv. Furthermore, two multiplications and two additions are needed to compute parameters lambda and mue, respectively. In addition, three comparison operations are required to determine the validity of the lambda and mue values. In this case, addition of the lambda and mue values may be additionally performed.

In detail, referring to FIG. 7B, the ray tracing apparatus 100 may perform a hit point test (computation of a hit point) by sequentially using arithmetic units, i.e., two (2) multipliers (mul), two (2) adders, four (4) multipliers, two (2) adders, one (1) or two (2) adders, and three (3) comparators (comp), according to a sequence of the algorithm illustrated in Table 3.

Figures 8A, 8B:
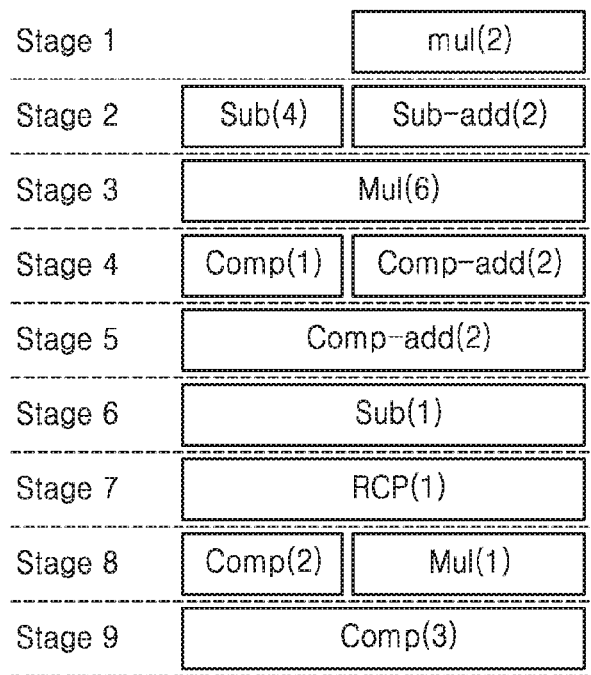
FIG. 8A illustrates an example in which arithmetic operations included in a ray-node intersection test (traversal (TRV)-axis-aligned bounding box (AABB)), an intersection distance test (intersection test (IST)-T), and a hit point test (IST-H) are performed by the same arithmetic unit.
FIG. 8B illustrates an example pipeline structure of a TRV/IST integrator.

FIG. 8A illustrates an example in which arithmetic operations in a ray-node intersection test (TRV-axis-aligned bounding box (AABB)), an intersection distance test (IST- T), and a hit point test (IST-H) are performed by the same arithmetic unit, and FIG. 8B illustrates a pipeline structure of the TRV/IST integrator 120 according to an example embodiment.

At least one of a plurality of arithmetic operations included in each of the ray-node intersection test, an intersection distance test, and a hit point test according to an example embodiment may be performed by the same arithmetic unit. Each stage in the pipeline structure of the TRV/IST integrator 120 may be constructed based on arithmetic operations that can be performed via the same arithmetic unit.

For example, addition and subtraction may be performed using the same arithmetic unit. Furthermore, a comparison operation and addition, or a comparison operation and subtraction may also be performed using the same arithmetic unit. Arithmetic operations included in each of a ray-node intersection test, an intersection distance test, and a hit point test may be arranged based on arithmetic operations that can be performed via the same arithmetic unit so that a maximum number of same arithmetic units may be used.

Referring to FIG. 8A, arithmetic operations on the same line may be performed at the same stage of a pipeline. For example, operations such as six subtractions in the ray-node intersection test (TRV-AABB) and two additions in the hit point test (IST-H) may be performed via same arithmetic unit at the same stage of the pipeline. Thus, a corresponding stage of the pipeline (e.g., a second stage (Stage 2) shown in FIG. 8B) may include a combination of two sub-add units and four subtractors or six sub-add units. In this case, if an area occupied by a sub-add unit is larger than an area occupied by a subtractor, use of the combination of two sub-add units and four subtractors may be more efficient than use of the six sub-add units in terms of hardware area requirements.

Furthermore, six multiplications in the ray-node intersection test (TRV-AABB), four multiplications in the intersection distance test (IST-T), and four multiplications in the hit point test (IST-H) may be performed via the same arithmetic unit at the same stage of the pipeline. Thus, a corresponding stage of the pipeline (e.g., a third stage (Stage 3) shown in FIG. 8B) may include six multipliers.

Furthermore, three comparison operations in the ray-node intersection test (TRV-AABB), two additions in the intersection distance test (IST-T), and two additions in the hit point test (IST-H) may be performed via the same arithmetic unit at the same stage of the pipeline. Thus, a corresponding stage of the pipeline (e.g., a fourth stage (Stage 4) shown in FIG. 8B) may include a combination of two comp-add units and one comparator, or three comp-add units. In this case, if an area occupied by a comp-add unit is larger than that occupied by a comparator, use of the combination of two comp-add unit and one comparator may be more efficient than use of the three comp-add units in terms of hardware area requirements.

Furthermore, two comparison operations in the ray-node intersection test (TRV-AABB), two additions in the intersection distance test (IST-T), and two additions in the hit point test (IST-H) may be performed via the same arithmetic unit at the same stage of the pipeline. Thus, a corresponding stage of the pipeline (e. g., a fifth stage (Stage 5) shown in FIG. 8B) may include two comp-add units.

Furthermore, three comparison operations in the ray-node intersection test (TRV-AABB), two comparison operations in the intersection distance test (IST-T), and three comparison operations in the hit point test (IST-H) may be performed via the same arithmetic unit at the same stage of the pipeline. Thus, a corresponding stage of the pipeline (e. g., a ninth stage (Stage 9) shown in FIG. 8B) may include three comparators.

Furthermore, two multiplications in the hit point test (IST-H) cannot share an arithmetic unit with other arithmetic operations and may be performed using two multipliers at a first stage (Stage 1) of the pipeline. Furthermore, one subtraction and one inversion operation in the intersection distance test (IST-T) cannot be performed via same arithmetic unit with other arithmetic operations and thus may be sequentially performed using a subtractor at a sixth stage (Stage 6) and a reciprocal (RCP) at a seventh stage (Stage 7), respectively.

In addition, two comparison operations in the ray-node intersection test (TRV-AABB) and one multiplication in the intersection distance test (IST-T) cannot be performed via same arithmetic unit, although they may be performed at the same stage. Thus, a corresponding stage of the pipeline (e. g., an eighth stage (Stage 8) may include two comparators and one multiplier.

As shown in FIG. 8B, if arithmetic units are arranged at each stage of a pipeline structure, the ray-node intersection test (TRV-AABB), the intersection distance test (IST-T), and the hit point test (IST-H) may be performed through the same pipeline. Furthermore, the time required to process data (perform the arithmetic operations) may be constant or vary for each stage of the pipeline structure. For example, it may take a longer time to perform an inversion operation at the seventh stage (Stage 7) of the pipeline structure than that taken to perform other arithmetic operations at the other stages thereof. However, example embodiments are not limited thereto.

Each stage of the pipeline structure may include a register for receiving a ray. If a ray input to the register does not require performing an arithmetic operation at a certain stage, the ray may be bypassed to a register at the next stage. For example, since a multiplication is not required at the first stage (Stage 1) of the pipeline structure in the ray-node intersection test (TRV-AABB), a ray input to a register at the first stage (Stage 1) may be bypassed to a register at the second stage (Stage 2).

Although FIGS. 8A and 8B show an example of a single AABB structure for testing a single node for intersection during transversal of an acceleration structure, the ray tracing apparatus 100 according to example embodiments may have a dual AABB structure for simultaneously testing two child nodes (right and left nodes) for ray intersection. In this case, the pipeline may be constructed to include twice as many arithmetic units as shown in FIGS. 8A and 8B. Accordingly, the ray tracing apparatus 100 may perform ray-node intersection tests on the two child nodes simultaneously and also perform intersection distance tests and hit point tests on two primitives in parallel or simultaneously.

Figure 9:
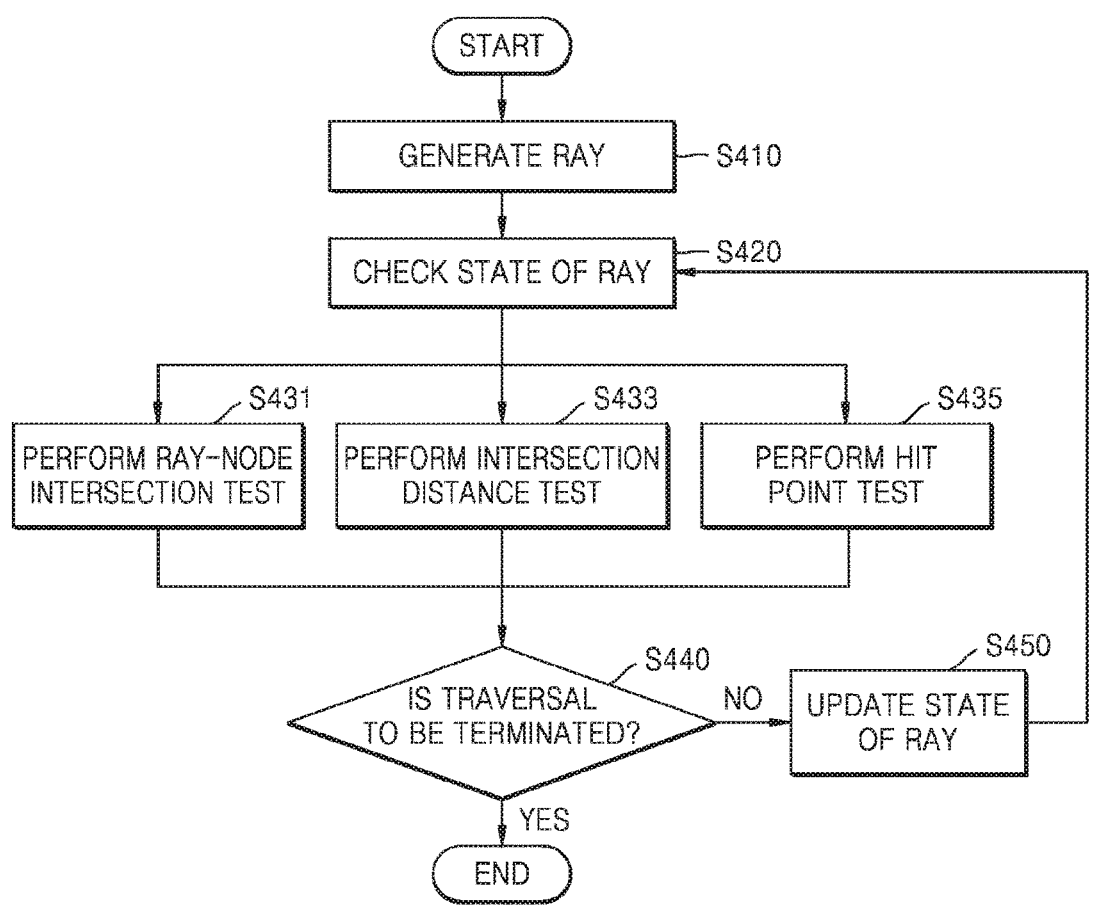
FIG. 9 is a flowchart of a ray tracing method according to an example embodiment.

FIG. 9 is a flowchart of a ray tracing method according to an example embodiment.

Referring to FIG. 9, the ray tracing apparatus 100 generates a ray in operation S410. Since operation S410 corresponds to operation S210 of FIG. 2, a detailed description of operation S410 is omitted.

Referring to FIG. 9, the ray tracing apparatus 100 checks a state of a ray in operation S420). Thereafter, the ray tracing apparatus determines one of a ray-node intersection test (operation S431), an intersection distance test (operation S433), and a hit point test (operation S435) based on the state of the ray, and performs the determined test.

More specifically, with respect to operations S431, S433 and S435, the ray tracing apparatus 100 determines whether the state of the ray is suitable for the ray-node intersection test, the intersection distance test, or the hit point test. For example, if a ray is initially input, the ray tracing apparatus 100 may perform a ray-node intersection test on a node included in an acceleration structure. Alternatively, if a primitive intersected by a ray is detected in a previous ray-node intersection test, the ray tracing apparatus 100 may perform an intersection distance test between the ray and the primitive. Alternatively, if an intersection distance between the ray and the primitive is determined to be a valid distance as a result of the intersection distance test, the ray tracing apparatus 100 may perform a hit point test between the ray and the primitive.

In operation S440, the ray tracing apparatus 100 determines whether to terminate ray traversal of an acceleration structure based on a result obtained by performing the ray-node intersection test, the intersection distance test, or the hit point test. For example, if a result of the ray-node intersection test shows that the ray does not intersect a node or a node to be traversed does not exist anymore, the ray tracing apparatus 10 may terminate the ray traversal of the acceleration structure. Alternatively, if a result of the intersection distance test shows that an intersection distance is not a valid distance and a node or primitive to be traversed does not exist anymore, the ray tracing apparatus 100 may terminate ray traversal of the acceleration structure. Alternatively, if a hit point is calculated and a node or primitive to be traversed does not exist anymore, the ray tracing apparatus 100 may transmit the hit point to the shader 140 and terminate the ray traversal of the acceleration structure.

On the other hand, if the ray traversal of the acceleration structure is not terminated, the ray tracing apparatus 100 may update the state of the ray in operation S450.

For example, if a leaf note intersected by the ray is detected as a result of the ray-node intersection test, the ray tracing apparatus 100 updates the state of the ray to be suitable for performing an intersection distance test between the ray and a primitive contained in the leaf node. Alternatively, if an intersection distance is determined as a valid distance as a result of the intersection distance test, the ray tracing apparatus 100 updates the state of the ray to be suitable for computing a hit point. However, operations for updating the state of a ray are not limited to these example embodiments.

The ray with the updated state may be fed back to the TRV/IST integrator 120.

Figure 10:
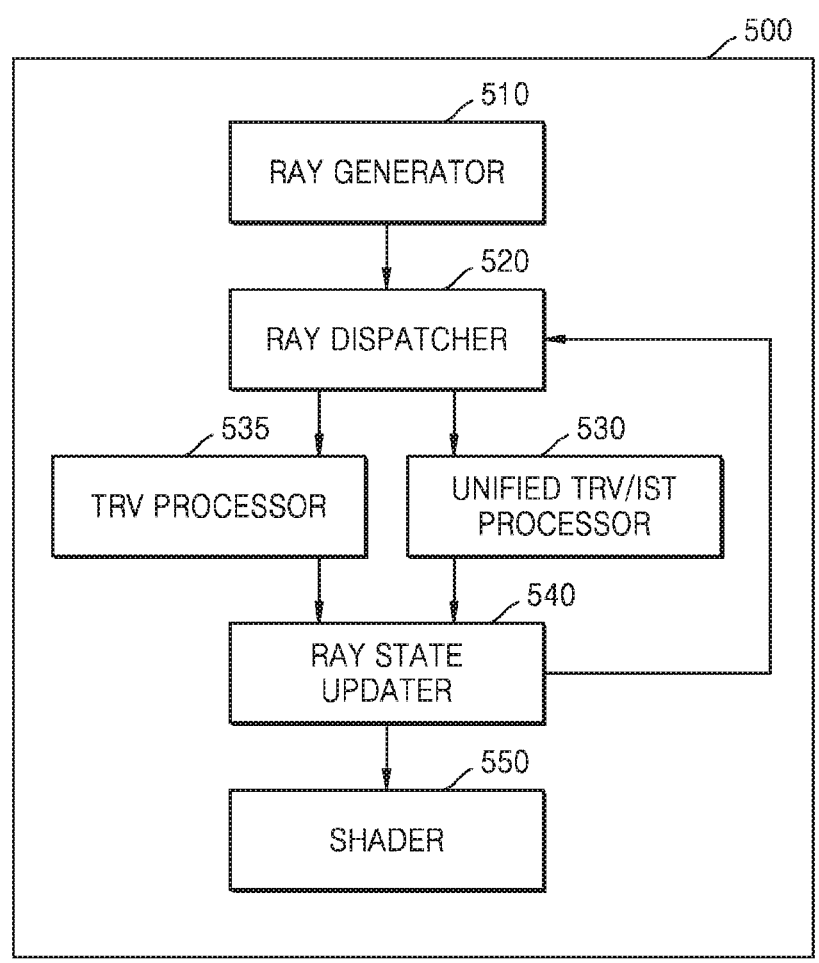
FIG. 10 is a block diagram of another example ray tracing apparatus.

FIG. 10 is a block diagram of a ray tracing apparatus 500 according to another example embodiment. Referring to FIG. 10, the ray tracing apparatus 500 includes a ray generator 510, a ray dispatcher 520, a TRV tester 535, a TRV/IST integrator 530, a ray state updater 540, and a shader 550.

Since the ray generator 510, the TRV/IST integrator 530, the ray state updater 540, and the shader 550 respectively correspond to the ray generator 110, the TRV/IST integrator 120, the ray state updater 130, and the shader 140, detailed descriptions thereof are omitted.

The TRV tester 535 may perform only a ray-node intersection test.

The ray dispatcher 520 may determine whether to transmit an input ray to the TRV tester 535 or the TRV/IST integrator 530 based on a state of the input ray and workloads of the TRV tester 535 and the TRV/IST integrator 530.

For example, if the state of the ray input to the ray dispatcher 520 is suitable for performing an intersection distance test or a hit point test, the ray dispatcher 520 may transmit the input ray to the TRV/IST integrator 530.

Alternatively, if the state of the ray input to the ray dispatcher 520 is suitable for performing a ray-node intersection test and a workload of the TRV tester 535 is lower than a workload of the TRV/IST integrator 530, the ray dispatcher 520 may transmit the input ray to the TRV tester 535.

Alternatively, if the state of the ray input to the ray dispatcher 520 is suitable for performing a ray-node intersection test and a workload of the TRV/IST unit 530 is lower than a workload of the TRV tester 535, the ray dispatcher 520 may transmit the input ray to the TRV/IST integrator 530.

Thus, if a workload generated by the ray-node intersection test is higher than a workload generated by the intersection distance test or hit point test, the ray tracing apparatus 100 may distribute the ray appropriately to the TRV tester 535, thereby balancing the overall workloads and thus improving the ray tracing processing speed.

Figure 11:
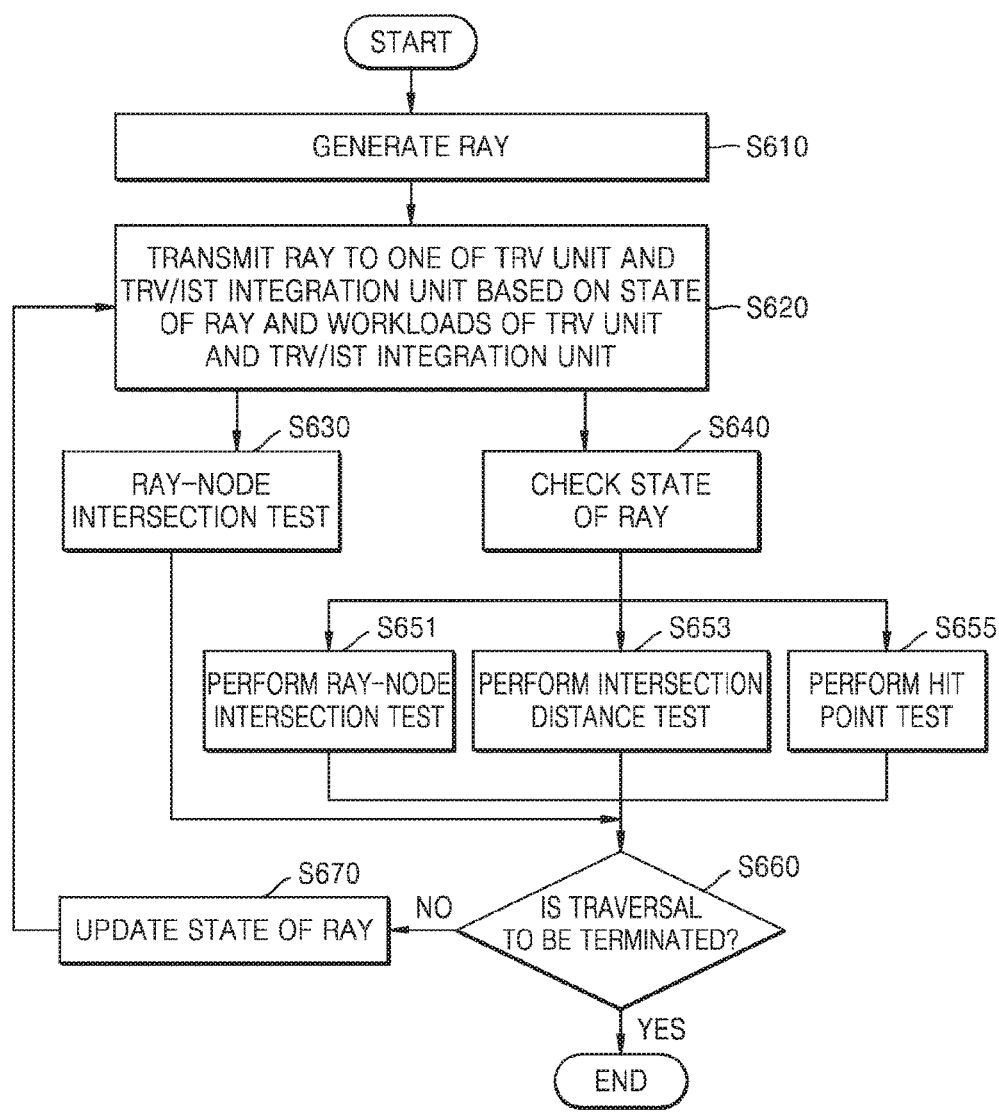
FIG. 11 is a flowchart of another example ray tracing method.

FIG. 11 is a flowchart of a ray tracing method according to another example embodiment.

Referring to FIG. 11, the ray tracing apparatus 500 of FIG. 10 generates a ray in operation S610. Since operation S610 corresponds to operation S210 of FIG. 2, a detailed description of operation S610 is omitted.

Referring to FIG. 11, in operation S620, the ray tracing apparatus 500 transmits an input ray to one of the TRV tester 535 and the TRV/IST integrator 530, based on at least one of a state of the input ray and workloads of the TRV tester 535 and the TRV/IST integrator 530.

For example, if a state of the input ray is suitable for performing an intersection distance test or a hit point test, the ray tracing apparatus 500 may transmit the input ray to the TRV/IST integrator 530.

On the other hand, if the state of the input ray is suitable for performing a ray-node intersection test and a workload of the TRV tester 535 is lower than a workload of the TRV/IST integrator 530, the ray tracing apparatus 500 may transmit the input ray to the TRV tester 535. Furthermore, if the state of the input ray is suitable for performing a ray-node intersection test and a workload of the TRV/IST integrator 530 is lower than a workload of the TRV tester 535, the ray tracing apparatus 500 may transmit the input ray to the TRV/IST integrator 530.

If the ray is transmitted to the TRV tester 535, the ray tracing apparatus 500 performs a ray-node intersection test in operation S630.

On the other hand, if the ray is transmitted to the TRV/IST integrator 530, the ray tracing apparatus 500 checks the state of the input ray (operation S640) and performs one of a ray-node intersection test (operation S651), an intersection distance test (operation S653), and a hit point test (operation S655) based on the state of the input ray.

In operation S660, the ray tracing apparatus 500 determines whether to terminate traversal based on a result of the ray-node intersection test, the intersection distance test, or the hit point test. If it is determined that the traversal is not to be terminated, the ray tracing apparatus 500 updates the state of the ray in operation S670. Since operations S660 and S670 respectively correspond to operations S440 and S450 of FIG. 9, detailed descriptions of operations S660 and S670 are omitted.

The apparatuses, units, modules, devices, and other components illustrated in FIGS. 2, 4 and 10 (e.g., the acceleration structure generator 250, external memory 270, ray generator 110/510, TRV/IST integrator 120/530, ray state updater 130, shader 140/550, ray dispatcher 520, TRV tester 535 and ray state updater 540) that perform the operations described herein with respect to FIGS. 2, 9 and 11 are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 2, 9 and 11. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2, 9 and 11 that perform the operations described herein with respect to FIGS. 2, 4 and 10 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A ray tracing apparatus comprising:
    a ray generator configured to generate a ray and transmit the ray; and
    an unified traversal (TRV)/intersection test (IST) processor configured to
        receive the ray,
        determine one of a ray-node intersection test, an intersection distance test, and a hit point test to be performed based on a state of the ray thereto, and
        perform the determined test with respect to the ray,
    wherein the unified TRV/IST processor is configured to perform the ray-node intersection test, the intersection distance test, and the hit point test with respect to the ray through a same pipeline, the pipeline including a plurality of stages, each of the stages including at least one arithmetic unit configured to perform processing for each of the ray-node intersection test, the intersection distance test, and the hit point test of the corresponding stage, and
    determine the at least one arithmetic unit to be used at each of the stages based on a hardware area occupied by each of the at least one arithmetic unit.

2. The ray tracing apparatus of claim 1, further comprising:

a ray state updater configured to update the state of the ray received from the unified TRV/IST processor based on a result obtained by performing the determined test and transmit the ray to the unified TRV/IST processor.

3. The ray tracing apparatus of claim 2, wherein the ray state updater is configured to:
update the state of the ray so as not to perform the hit point test between the ray and a first primitive intersected by the ray, when a distance from the ray to the first primitive is determined not to be a valid distance as a result of the intersection distance test.

4. The ray tracing apparatus of claim 2, wherein the ray state updater is configured to:
update the state of the ray so as to perform the hit point test between the ray and a first primitive intersected by the ray, when a distance from the ray to the first primitive is determined to be valid distance as a result of the intersection distance test.

5. The ray tracing apparatus of claim 1, wherein the unified TRV/IST processor is further configured to:
perform at least one arithmetic operation included in the ray-node intersection test, at least one arithmetic operation included in the intersection distance test, and at least one arithmetic operation included in the hit point test via the same arithmetic unit in at least one stage included in the same pipeline.

6. The ray tracing apparatus of claim 1, further comprising:
a shader configured to
receive a hit point between the ray and a primitive intersected by the ray, and
determine a color value of a pixel based on the hit point.

7. The ray tracing apparatus of claim 1, further comprising:
a TRV processor configured to perform only the ray-node intersection test.

8. The ray tracing apparatus of claim 7, further comprising:
a ray dispatcher configured to determine whether to transmit the ray to the TRV processor or the unified TRV/IST processor based on the state of the ray and workloads of the TRV processor and the unified TRV/IST processor.

9. A ray tracing method comprising:
generating a ray at a ray generator;
inputting the ray to an unified traversal (TRV)/intersection test (IST) processor;
determining, at the unified TRV/IST processor, one of a ray-node intersection test, an intersection distance test, and a hit point test based on a state of the ray; and
performing, at the unified TRV/IST processor, the determined test with respect to the ray,
wherein the at the unified TRV/IST processor is configured to perform the ray-node intersection test, the intersection distance test, and the hit point test with respect to the ray through a same pipeline, the pipeline including a plurality of stages, each of the stages including at least one arithmetic unit configured to perform processing for each of the ray-node intersection test, the intersection distance test, and the hit point test of the corresponding stage, and
determine the at least one arithmetic unit to be used at each of the stages based on a hardware area occupied by each of the at least one arithmetic unit.

10. The ray tracing method of claim 9, further comprising:
updating, at a ray state updater, the state of the ray received from the unified TRV/IST processor, based on a result obtained by performing the determined test; and
transmitting the ray to the unified TRV/IST processor.

11. The ray tracing method of claim 10, wherein the updating of the state of the ray comprises updating the state of the ray so as not to perform the hit point test between the ray and a first primitive, when a distance from the ray to the first primitive intersected by the ray is determined not to be a valid distance as a result of the intersection distance test.

12. The ray tracing method of claim 10, wherein the updating of the state of the ray comprises updating the state of the ray so as to perform the hit point test between the ray and a first primitive when a distance from the ray to the first primitive intersected by the ray is determined to be a valid distance as a result of the intersection distance test.

13. The ray tracing method of claim 9, wherein at least one arithmetic operation included in the ray-node intersection test, at least one arithmetic operation included in the intersection distance test, and at least one arithmetic operation included in the hit point test are performed via the same arithmetic unit in at least one stage included in the same pipeline.

14. The ray tracing method of claim 9, further comprising:
performing shading at a shader by determining a color value of a pixel based on a hit point between the ray and a primitive intersected by the ray, the hit point being calculated as a result of the hit point test.

15. The ray tracing method of claim 9, further comprising:
performing the ray-node intersection test through a pipeline other than the same pipeline.

16. The ray tracing method of claim 15, further comprising:
determining, at a ray dispatcher, whether the ray is to be transmitted to a TRV processor or the unified TRV/IST processor, based on the state of the ray and workloads of the TRV processor including the pipeline other than the same pipeline and the unified TRV/IST processor including the same pipeline.

17. A non-transitory computer-readable recording medium having recorded thereon a program configured to execute the method of claim 9 on a computer.

18. A ray tracing apparatus comprising:
a ray generator configured to generate a ray; and
a ray dispatcher configured to transmit the ray to a traversal (TRV) processor configured to perform, with respect to the ray, only a ray-node intersection test, or
an unified TRV/intersection test (IST) processor configured to perform, with respect to the ray, one of the ray-node intersection test, an intersection distance test, and a hit point test, through a same pipeline, the pipeline including a plurality of stages, each of the stages including at least one arithmetic unit configured to perform processing for each of the ray-node intersection test, the intersection distance test, and the hit point test of the corresponding stage, and
determine the at least one arithmetic unit to be used at each of the stages based on a hardware area occupied by each of the at least one arithmetic unit;
wherein the ray dispatcher is configured to determine whether to transmit the ray to the TRV processor or the unified TRV/IST processor based on a state of the ray and workloads of the TRV processor and the unified TRV/IST processor.

19. The ray tracing apparatus of claim 18, wherein:
the ray dispatcher is configured to transmit the ray to the TRV processor when the state of the ray is suitable for performing the ray-node intersection test and the workload of the TRV processor is lower than the workload of the unified TRV/IST processor; and
the ray dispatcher is configured to transmit the ray to the TRV/IST processor when the state of the ray is suitable for performing the ray-node intersection test and the workload of the unified TRV/IST processor is lower than the workload of the TRV processor.

\* \* \* \* \*